US006912647B1

United States Patent
Blandy (10) Patent No.: US 6,912,647 B1
(45) Date of Patent: Jun. 28, 2005

(54) APPARATUS AND METHOD FOR CREATING INSTRUCTION BUNDLES IN AN EXPLICITLY PARALLEL ARCHITECTURE

(75) Inventor: Geoffrey Owen Blandy, Austin, TX (US)

(73) Assignee: International Business Machines Corportion, Armonk, NY (US)

( * ) Notice: Subject to any disclaimer, the term of this patent is extended or adjusted under 35 U.S.C. 154(b) by 627 days.

(21) Appl. No.: 09/671,875

(22) Filed: Sep. 28, 2000

(51) Int. Cl.$^7$ ............................................... G06F 9/38
(52) U.S. Cl. ...................................... 712/24; 712/203
(58) Field of Search ......................... 712/24, 203, 209, 712/210, 215, 234, 241

(56) References Cited

U.S. PATENT DOCUMENTS

| | | | |
|---|---|---|---|
| 4,435,753 A | 3/1984 | Rizzi ........................... | 364/200 |
| 4,642,764 A | 2/1987 | Auslander et al. .......... | 364/300 |
| 4,782,444 A | 11/1988 | Munshi et al. .............. | 364/300 |
| 4,833,599 A | * 5/1989 | Colwell et al. ............. | 712/236 |

(Continued)

OTHER PUBLICATIONS

Fitzgerald et al., "Marmot: An Optimizing Compiler for Java", Microsoft Research, Jun. 16, 1999, Technical Report MSR–TR–99–33, pp. 1–29.

Azevedo et al., "Java Annotation–Aware Just–In–Time (AJIT) Compilation System", ACM 1999, San Francisco, CA, USA, pp. 142–151.

Larus et al., "SPIM S20: A MIPS R2000 Simulator", Computer Sciences Department, University of Wisconsin, Madison, copyright 1990–1997, pp. 1–25.

Aho et al., "Compilers: Principles, Techniques, and Tools", copyright 1986, Bell Telephone Labs, Inc., 4 pages.

Sinclair et al., "ASIC Design for Conditional Nested Loops with Predicate Registers", Aug. 11, 1999, Circuits and Systems, 1999, $42^{nd}$ Midwest Symposium, vol. 2, pp. 874–877.

"The Java Virtual Machine Specification", Sun Microsystems, Inc., copyright 1997, http://java.sun.com/docs/books/vmspec/html/Instructions2.doc14.html.

Fernandez, "Simple and Effective Link–Time Optimization of Modula–3 Programs", Nov. 7, 1994, pp. 1–7.

Ishizaki et al., Design, Implementation, and Evaluation of Optimizations in a Just–In–Time Compiler, ACM, Jun. 1999, pp. 119–122.

*Primary Examiner*—Henry W. H. Tsai
(74) *Attorney, Agent, or Firm*—Duke W. Yee; Volel Emile; Francis Lammes (57) ABSTRACT

An apparatus and method for creating instruction groups for explicitly parallel architectures is provided. The apparatus and method accept instruction groups as input and determine a number of each possible type of instruction in the instruction group. Based on the number of each possible type of instruction in the instruction group, instruction bundling is performed such that the instructions in the instruction group are bundled into efficiently executed bundles. The instruction bundling further accommodates intra-bundle stop bundles in the event that more efficient bundles are not possible. The instruction bundling is performed based on a most restrictive instruction type placement first and proceeds to less restrictive instruction type placement.

36 Claims, 6 Drawing Sheets

U.S. PATENT DOCUMENTS

| | | | | |
|---|---|---|---|---|
| 4,961,141 A | | 10/1990 | Hopkins et al. | 364/200 |
| 5,057,837 A | * | 10/1991 | Colwell et al. | 341/55 |
| 5,448,746 A | | 9/1995 | Eickemeyer et al. | 395/800 |
| 5,497,499 A | * | 3/1996 | Garg et al. | 712/217 |
| 5,502,827 A | | 3/1996 | Yoshida | 395/375 |
| 5,504,932 A | * | 4/1996 | Vassiliadis et al. | 712/208 |
| 5,574,928 A | | 11/1996 | White et al. | 395/800 |
| 5,600,810 A | * | 2/1997 | Ohkami | 712/226 |
| 5,613,121 A | | 3/1997 | Blainey | 395/709 |
| 5,627,981 A | | 5/1997 | Adler et al. | 395/582 |
| 5,628,016 A | | 5/1997 | Kukol | 395/704 |
| 5,634,023 A | | 5/1997 | Adler et al. | 395/591 |
| 5,669,001 A | * | 9/1997 | Moreno | 717/149 |
| 5,748,936 A | | 5/1998 | Karp et al. | 395/394 |
| 5,761,470 A | * | 6/1998 | Yoshida | 712/210 |
| 5,764,962 A | | 6/1998 | Buzbee | 395/500 |
| 5,768,510 A | | 6/1998 | Gish | 395/200.33 |
| 5,778,219 A | | 7/1998 | Amerson et al. | 395/591 |
| 5,787,302 A | * | 7/1998 | Hampapuram et al. | 712/24 |
| 5,812,850 A | | 9/1998 | Wimble | 395/704 |
| 5,819,058 A | * | 10/1998 | Miller et al. | 712/210 |
| 5,826,054 A | * | 10/1998 | Jacobs et al. | 712/213 |
| 5,828,886 A | | 10/1998 | Hayashi | 395/704 |
| 5,848,246 A | | 12/1998 | Gish | 395/200.58 |
| 5,922,065 A | * | 7/1999 | Hull et al. | 712/24 |
| 5,966,537 A | | 10/1999 | Ravichandran | 395/709 |
| 6,009,517 A | | 12/1999 | Bak et al. | 712/245 |
| 6,018,799 A | | 1/2000 | Wallace et al. | 712/300 |
| 6,035,120 A | | 3/2000 | Ravichandran | 395/705 |
| 6,041,399 A | | 3/2000 | Terada et al. | 712/24 |
| 6,061,781 A | | 5/2000 | Jain et al. | 712/221 |
| 6,101,592 A | | 8/2000 | Pechanek et al. | 712/20 |
| 6,108,771 A | | 8/2000 | Gaertner et al. | 712/217 |
| 6,110,226 A | | 8/2000 | Bothner | 717/7 |
| 6,151,703 A | | 11/2000 | Crelier | 717/5 |
| 6,158,048 A | | 12/2000 | Lueh et al. | 717/9 |
| 6,237,077 B1 | * | 5/2001 | Sharangpani et al. | 712/24 |
| 6,240,510 B1 | | 5/2001 | Yeh et al. | 712/236 |
| 6,286,346 B1 | | 9/2001 | Hocken, Jr. et al. | 70/260 |
| 6,301,705 B1 | | 10/2001 | Doshi et al. | 717/9 |
| 6,308,318 B2 | | 10/2001 | Krishnaswamy | 717/5 |
| 6,311,325 B1 | | 10/2001 | Levine et al. | 717/4 |
| 6,317,872 B1 | | 11/2001 | Gee et al. | 717/7 |
| 6,317,876 B1 | | 11/2001 | Kunz et al. | 717/9 |
| 6,321,322 B1 | | 11/2001 | Pechanek et al. | 712/24 |
| 6,324,687 B1 | | 11/2001 | Beadle et al. | 717/6 |
| 6,336,213 B1 | | 1/2002 | Beadle et al. | 717/5 |
| 6,339,841 B1 | | 1/2002 | Merrick et al. | 717/10 |
| 6,385,660 B2 | | 5/2002 | Griesemer et al. | 709/315 |
| 6,408,433 B1 | | 6/2002 | Click, Jr. et al. | 717/154 |
| 6,412,105 B1 | | 6/2002 | Maslennikov et al. | 717/9 |
| 6,427,234 B1 | | 7/2002 | Chambers et al. | 717/140 |
| 6,442,676 B1 | | 8/2002 | Guenthner | 712/210 |
| 6,446,195 B1 | | 9/2002 | Ganapathy et al. | 712/221 |
| 6,466,972 B1 | | 10/2002 | Paul et al. | 709/222 |
| 6,487,601 B1 | | 11/2002 | Hubacher et al. | 709/229 |
| 6,507,946 B2 | | 1/2003 | Alexander, III et al. | 717/145 |
| 6,513,109 B1 | | 1/2003 | Gschwind et al. | 712/200 |
| 6,539,473 B1 | | 3/2003 | Hubacher et al. | 713/2 |
| 6,560,624 B1 | | 5/2003 | Otani et al. | 708/655 |
| 6,567,974 B1 | | 5/2003 | Czajkowski | 717/151 |
| 6,571,385 B1 | | 5/2003 | Muthukumar et al. | 717/150 |
| 6,604,167 B1 | | 8/2003 | Blandy et al. | 711/100 |
| 6,615,403 B1 | | 9/2003 | Muthukumar et al. | 717/160 |
| 6,622,234 B1 | | 9/2003 | Pechanek et al. | 712/22 |
| 6,622,238 B1 | | 9/2003 | Benjamin et al. | 712/226 |
| 6,640,313 B1 | | 10/2003 | Quach | 714/10 |
| 6,640,315 B1 | | 10/2003 | Hwu et al. | 714/17 |
| 6,658,551 B1 | * | 12/2003 | Berenbaum et al. | 712/24 |
| 6,675,375 B1 | | 1/2004 | Czajkowski | 717/151 |

* cited by examiner

FIG. 1

| TEMPLATE | SLOT 0 | SLOT 1 | SLOT 2 |
| --- | --- | --- | --- |
| 00 | M-unit | I-unit | I-unit |
| 01 | M-unit | I-unit | I-unit |
| 02 | M-unit | I-unit | I-unit |
| 03 | M-unit | I-unit | I-unit |
| 04 | M-unit | L-unit | X-unit |
| 05 | M-unit | L-unit | X-unit |
| 06 | | | |
| 07 | | | |
| 08 | M-unit | M-unit | I-unit |
| 09 | M-unit | M-unit | I-unit |
| 0A | M-unit | M-unit | I-unit |
| 0B | M-unit | M-unit | I-unit |
| 0C | M-unit | F-unit | I-unit |
| 0D | M-unit | F-unit | I-unit |
| 0E | M-unit | M-unit | F-unit |
| 0F | M-unit | M-unit | F-unit |
| 10 | M-unit | I-unit | B-unit |
| 11 | M-unit | I-unit | B-unit |
| 12 | M-unit | B-unit | B-unit |
| 13 | M-unit | B-unit | B-unit |
| 14 | | | |
| 15 | | | |
| 16 | B-unit | B-unit | B-unit |
| 17 | B-unit | B-unit | B-unit |
| 18 | M-unit | M-unit | B-unit |
| 19 | M-unit | M-unit | B-unit |
| 1A | | | |
| 1B | | | |
| 1C | M-unit | F-unit | B-unit |
| 1D | M-unit | F-unit | B-unit |
| 1E | | | |
| 1F | | | |

*FIG. 2*

Main Loop:

While there are unprocessed instruction groups {
    Select next instruction group.

TopOfGroup:
    For each instruction in the group:

switch on instruction_type {
        case TypeA:
            TypesA++;
            TypesMIA++;
            break;
        case TypeM:
            TypesM++;
            TypesMIA++;
            break;
        case TypeI:
            TypesI++;
            TypesMIA++;
            break;
        case TypeB:
            TypesB++;
            break;
        case TypeF:
            TypesF++;
            break;
        case TypeLl:
            TypesLl++;
            break;
        default:
            error;
        }
        TypesALL++;

/*-----------------------------+/
        | Test for the o previous incomplete boundle
        +-----------------------------*/
        if INCOMPLETE is not zero {
          if INCOMPLETE equals M_MI{
            INCOMPLETE = 0;

if despersal window is large {
MakeM_MI:
                Template = M_MI;
                take-M;
                take-I;
                goto StoreBundle;
            }
            remainder = size of instruction group % 3;

if remainder = 0 then: {
                if TypesI > 0 AND TypesF < TypesF-units AND TypesM+TypesA < bundle count then:
                    goto MakeM_MI;
                else
                    goto MakeMFB;

FIG. 3A

```
        }
        if remainder = 1 then: {
            if (TypesI > 0 OR TypesA > 0)  AND TypesF < TypesF-units AND
TypesM+TypesA < bundle count then:
                goto MakeM_MI;
            else
                goto MakeMFB;
        }
        /* remainder = 2 */
        if (TypesI > 0 OR TypesA > 0)  AND TypesF < TypesF-units AND
TypesM+TypesA >= bundle count then:
            goto MakeM_MI;

MakeMFB:
        Template = MFB_;
        nop;
        nopb;
        goto StoreBundle;
/*-----------------------------------------------------+/
| INCOMPLETE equals MI_I
+-------------------------------------------------------*/
    } else {
        INCOMPLETE = 0;
        if despersal window is large }
MakeMI_I:
        Template = MI_I;
        take-I;
        goto StoreBundle;
        }
        remainder = size of instruction group % 3
        if remainder = 2 then:
            goto MakeMIB;

if remainder = 0 then: {
            if TypesI > 0 AND TypesF < TypesF-units
            AND TypesM+TypesA < bundle count then: goto MakeMI_I;
            else goto MakeMIB;
        }
        /* remainder = 1 */
        if (TypesI > 0 OR TypesA > 0) AND TypesF < TypesF-units
        AND TypesM+TypesA < bundle count then: goto MakeMI_I;

MakeMIB:
        Template = MIB_;
        nopB;
        goto StoreBundle;
    }
}
```

FIG. 3B

While TypesALL > 0} // while instructions remain in group

```
if TypesALL is equal to TypesMIA {
  if TypesALL > 3 {
    if TypesM > TypesI+TypesA then: Template = MMI; toke-M;toke-M;toke-I
    else template = MII; toke-M;toke-I;toke-I
    goto StoreBundle;
  }
  if TypesALL = 3 and this is the first bundle of the group{
    if TypesI > 1 then: Template = MII; tokeM;toke-I;toke-I
    else template = MMI; toke-M;toke-I;toke-I
    goto StoreBundle;
  }
  if TypesALL = 2 OR TypesALL = 1 and TypesI = 1{
    if TypesM = 2 then: Template = MMF; toke-M;toke-M;nop; goto
StoreBundle;
    else INCOMPLETE = MI_I toke-M; toke-I; goto TopOfGroup
  }
  /* TypesALL = 1 */
    INCOMPLETE = M_MI toke-M; goto TopOfGroup
}
if TypesLX > 0 then: Template= MLX; toke-M; toke-LX; goto StoreBundle;

if TypesB > 0 AND TypesALL-TypesB < 3 then: {
  if typesF > 0 then: {
    if TypesF+TypesI = 2 then: Template= MFI nop;tokeF;toke-I; goto
StoreBundle;
    else Template=MFB toke-M;tokeF;toke-B; goto StoreBundle;
  { else if TypesI > 0 {
    if TypesI = 2 then: Template= MII  nop;tokeF;toke-I; goto StoreBundle;
    else Template=MIB toke-M;toke-I;toke-B; goto StoreBundle;
  }else if TypesM = 2 then: Template = MMB toke-M;toke-M;toke-B; goto
StoreBundle;
    else if TypesALL-TypesB = 2 then: Template = MIB toke-M;toke-I;toke-B;
goto StoreBundle;
    else if TypesB = 1 then: Template = MFB toke-M;tokeF;toke-B; goto
StoreBundle;
    else if there are 2 TypesB instructions  or 1 non-TypesB: Template = MBB
toke-M;toke-B;toke-B; goto StoreBundle;
    else Template = BBB toke-B;toke-B;toke-B; goto StoreBundle;
  }
  /* TypesF > 0 */
    if TypesALL = 3 AND TypesM = 2 then: Template = MMF toke-M;toke-M tokeF;
goto StoreBundle;
    else Template = MFI toke-M;tokeF toke-I; goto StoreBundle;
}
storeBundle:
  if TypesALL = 0 then: insert stop bit in Template;
  build bundle in code buffer;
  if TypesALL = 0 then: goto MainLoop;
  else goto TopOGroup;
}
DONE
  if INCOMPLETE is not zero then:    {
    if INCOMPLETE = M_MI then: Template = MFB; nop; nopB; goto StoreBundle;
    else Template = MIB; nopB; goto StoreBundle;
  {
```

APPARATUS AND METHOD FOR CREATING INSTRUCTION BUNDLES IN AN EXPLICITLY PARALLEL ARCHITECTURE

RELATED APPLICATIONS

The present invention is related to commonly assigned and co-pending U.S. patent application Ser. No. 09/671/876, filed Sep. 28, 2000, entitled "APPARATUS AND METHODS FOR IMPROVED DEVIRTUALIZATION OF METHOD CALLS", Ser. No. 09/671,770, filed Sep. 28, 2000, entitled "APPARATUS AND METHOD FOR AVOIDING DEADLOCKS IN A MULTITHREADED ENVIRONMENT", Ser. No. 09/671,973, filed Sep. 28, 2000, entitled "APPARATUS AND METHOD FOR IMPLEMENTING SWITCH INSTRUCTIONS IN AN IA64 ARCHITECTURE", Ser. No. 09/671,877, filed Sep. 28, 2000, entitled "APPARATUS AND METHOD FOR DETECTING AND HANDLING EXCEPTIONS", Ser. No. 09/671,771, filed Sep. 28, 2000, entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,873, filed Sep. 28, 2000, entitled "APPARATUS AND METHOD FOR AN ENHANCED INTEGER DIVIDE IN AN IA64 ARCHITECTURE", and Ser. No. 09/671,874, filed Sep. 28, 2000, entitled "APPARATUS AND METHOD FOR CREATING INSTRUCTION GROUPS FOR EXPLICITLY PARALLEL ARCHITECTURES", filed on even date herewith and hereby incorporated by reference.

BACKGROUND OF THE INVENTION

1. Technical Field

The present invention is directed to an apparatus and method for creating instruction bundles in an explicitly parallel architectures. More particularly, the present invention is directed to an apparatus and method for creating instruction bundles for the IA64 architecture.

2. Description of Related Art

Explicitly parallel architectures, such as IA64, require that instructions be organized into bundles comprising three instruction slots and a template field that identifies for each slot the execution unit type to which the instruction will be dispatched. Only a subset of instruction combinations are valid.

Because dynamic compilers, such as Just-In-Time compilers, typically compile methods as they are invoked, compile time is a direct contributor to response time and therefore, should be minimized. At the same time, the type of bundles selected have a direct effect on the execution time of the compiled method.

Thus, it would be beneficial to have an apparatus and method for quickly creating instruction bundles that will maximize instruction level parallelism and thereby optimize performance of the compiled method.

SUMMARY OF THE INVENTION

The present invention provides an apparatus and method for creating instruction groups for explicitly parallel architectures, and in particular, implementations of the IA64 architecture. The apparatus and method accept instruction groups as input. For each instruction group, bundles are created based on the types of instructions present in the group. The final bundle of each group will contain a stop bit to designate the end of the instruction group. In some cases the bundling process of one group is not completed until a subsequent group is examined to see if some or all of its instructions may be placed in the final bundle of the first group. When groups are combined in this way an intra-bundle stop bit is used to designate the end of the first instruction group. The instruction bundling is performed based on a most restrictive instruction type placement first and proceeds to less restrictive instruction type placement.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A–3C are diagrams illustrating pseudo-code for creating instruction groups for an explicitly parallel architecture in accordance with the present invention.

DETAILED DESCRIPTION OF THE PREFERRED EMBODIMENTS

Figure 1:
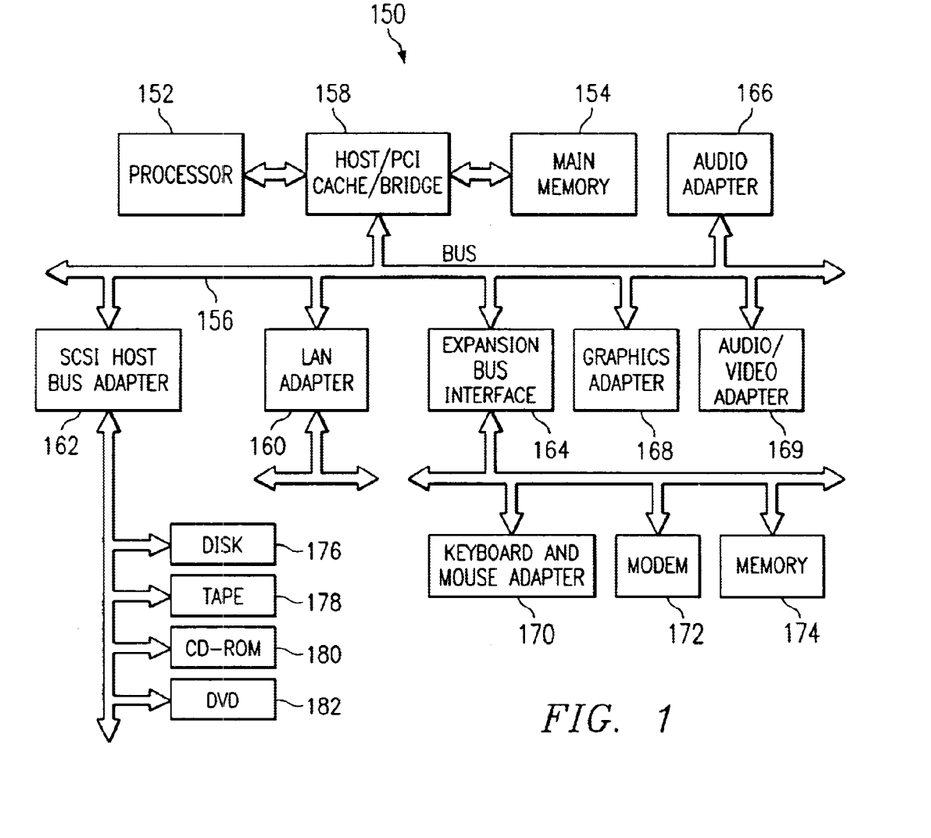
FIG. 1 is an exemplary block diagram of a data processing system according to the present invention.

With reference now to the figures, and in particular FIG. 1, a block diagram of a data processing system in which the present invention may be implemented is illustrated. Data processing system 150 is an example of a client computer, however, the present invention may be implemented in a server, stand-alone computing device, or the like. In short, the present invention may be implemented in any data processing device having an explicitly parallel architecture. By explicitly parallel architecture, what is meant is that the compiler or programmer is responsible for designating which instructions may be executed in parallel. The architecture provides a means for the compiler to identifying such groups of instructions. For example, in the IA64 architecture, described in greater detail hereafter, the stop bits provide this means for identifying groups of instructions.

Data processing system 150 employs a peripheral component interconnect (PCI) local bus architecture. Although the depicted example employs a PCI bus, other bus architectures such as Micro Channel and ISA may be used. Processor 152 and main memory 154 are connected to PCI local bus 156 through PCI Bridge 158. PCI Bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 166 by add-in boards inserted into expansion slots. Expansion bus interface 164 provides a connection for a keyboard and mouse adapter 170, modem 172, and additional memory 174. SCSI host bus adapter 162 provides a connection for hard disk drive 176, tape drive 178, and CD-ROM 180 in the depicted example. Typical PCI local bus implementations will support three or four PCI expansion slots or add-in connectors.

An operating system runs on processor 152 and is used to coordinate and provide control of various components within data processing system 150 in FIG. 1. The operating system may be a commercially available operating system such as OS/2, which is available from International Business Machines Corporation.

An object oriented programming system such as Java may run in conjunction with the operating system and may provide calls to the operating system from Java programs or applications executing on data processing system 150. Instructions for the operating system, the object oriented operating system, and applications or programs are located on storage devices, such as hard disk drive 176 and may be loaded into main memory 154 for execution by processor 152. Hard disk drives are often absent and memory is constrained when data processing system 150 is used as a network client.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides an apparatus and method for creating instruction bundles for explicitly parallel architectures. In particular, the present invention provides an apparatus and method for creating instruction bundles for implementations of the IA64 explicitly parallel architecture. The IA64 architecture is described in the "Intel IA-64 Architecture Software Developer's Manual", which is hereby incorporated by reference. While the present invention will be described with reference to the Itanium implementation of the IA64 architecture, the present invention is not limited to such. Rather, the present invention is applicable to any explicitly parallel architecture and any implementation of the IA64 architecture in particular.

An IA64 program consists of a sequence of instructions and stops packed in bundles. A bundle is 128 bits in size and contains 3 41-bit instruction slots and a 5 bit template. The template maps the instruction slots to the execution units to which they will be dispatched and identifies instruction group stops within the bundle. A bundle need not include any instruction group stops in which case the three instructions may be executed in parallel with some or all the instructions of the next bundle.

Figure 2:
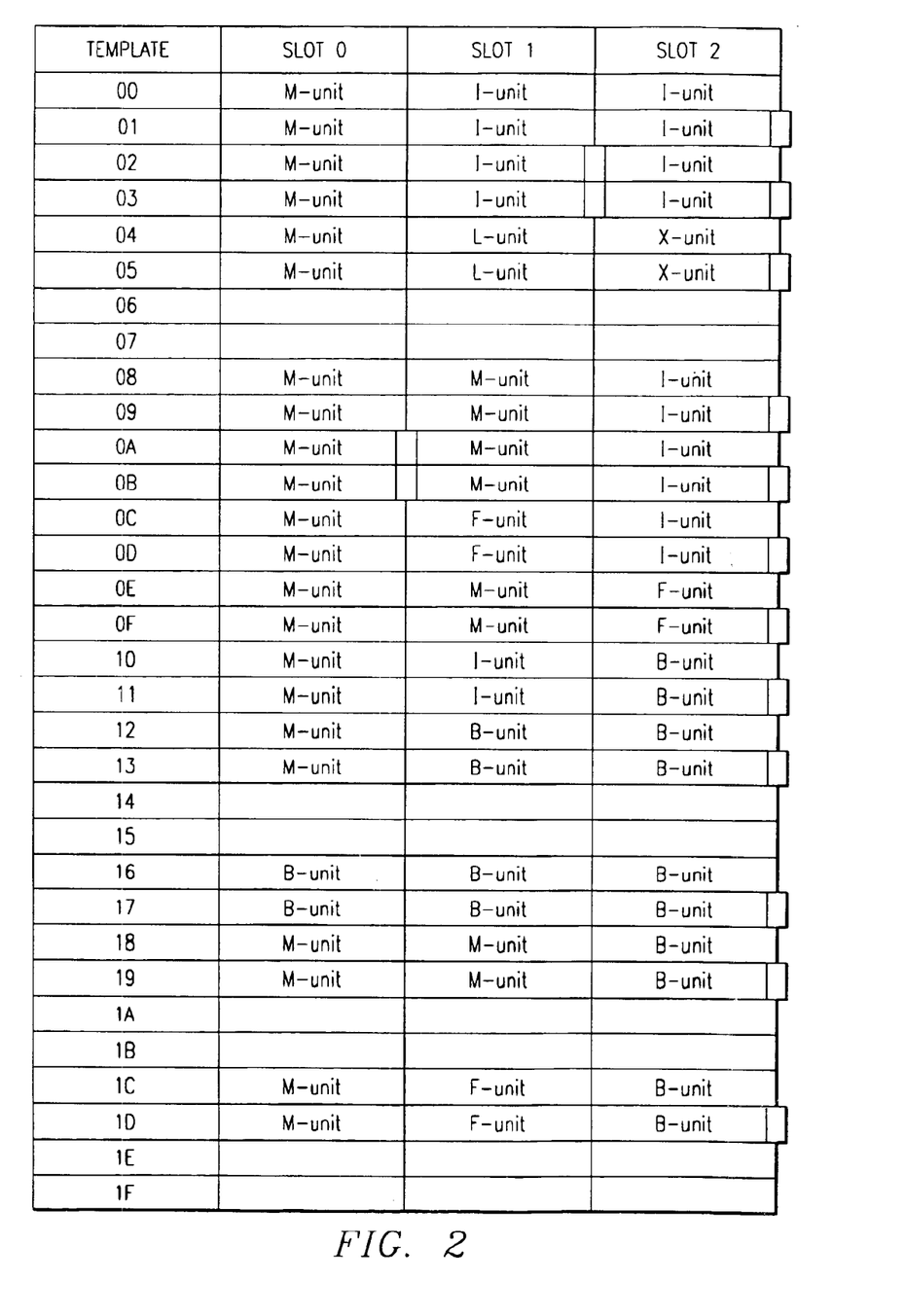
FIG. 2 is an exemplary diagram illustrating template field encoding and instruction slot mapping in accordance with an IA64 architecture.

FIG. 2 is an exemplary diagram illustrating instruction slots and template maps in accordance with the present invention. The double vertical lines in the figure represent stops which may be at the end of a bundle or at an intermediate point in the bundle.

An instruction group is a sequence of instructions starting at a given bundle address and slot number and including all instructions at sequentially increasing slot numbers and bundle addresses up to the first stop, taken branch, or fault. In IA64, instructions may be of six different types:

1) A, Integer Arithmetic Logic Unit (ALU);
2) I, Non-ALU Integer;
3) M, Memory;
4) F, Floating-point;
5) B, Branch; and
6) LX, Long immediate (this is used for generating 64 bit constants and long branches although the latter is not implemented on Itanium).

IA64 execution units may be of four different types:
1) Integer (I-unit), which can execute A, I and LX instructions;
2) Memory (M-unit), which can execute M and A instructions;
3) Floating-point (F-unit), which can execute F instructions; and
4) Branch (B-unit), which can execute B instructions.

In view of the above architecture, and resource limitations of the Itanium implementation of the IA64 architecture, certain combinations of instructions may be grouped for efficient parallel execution by the IA64 architecture execution units. Table 1 shows the various instruction groups that are currently supported by the Itanium implementation of the IA64 architecture. Note that the LX instruction occupies two slots.

TABLE 1

| Currently Supported Bundles | |
|---|---|
| MMF | Memory, Memory, Floating-point |
| MLX | Memory, Long immediate |
| MMI | Memory, Memory, Integer |
| MII | Memory, Integer, Integer |
| MFI | Memory, Floating-point, Integer |
| MMB | Memory, Memory, Branch |
| MFB | Memory, Floating-point, Branch |
| MIB | Memory, Integer, Branch |
| MBB | Memory, Branch, Branch |
| BBB | Branch, Branch, Branch |

As mentioned above, instruction group stops may occur after the final instruction of any of the bundles described by the preceding templates. Additionally, there are two templates that provide for stopping an instruction group prior to the last instruction in the bundle. These two templates are MI_I and M_MI, where the underscore indicates the location of the instruction stop. These two templates may also identify stops at the end of the bundle.

In addition to the above, the Itanium implementation of the IA64 architecture has asymmetric instruction units with regard to which instructions they can execute. For example, Itanium has 2 integer units (I0, I1) where I0 can execute the entire set of A, I and LX instructions but I1 is unable to execute certain specific instructions in that set such as extr and tbit. When dispatching instructions, the first I-unit instruction in the instruction group will be dispatched to I0 with the second going to I1. If I1 cannot execute the instruction because it is can only execute in I0, a stall occurs until the instruction in I0 is completed at which time the second I instruction will be dispatched to I0.

The same situation holds for the two floating point units, i.e. F0 can execute everything, F1 can execute only a subset) and the two memory units of the Itanium implementation of IA64. To avoid these stalls, the bundles must be arranged so that the restricted instructions occur ahead of non-restricted instructions. The restricted instructions are assigned type I0, F0 and M0.

It is important to note that, in the following description, NOP (pronounced "no-op") instructions may be dispatched to designated execution units. Any unit processing a NOP will be unavailable to process other instructions in the current instruction group. A NOP instruction is essentially an instruction that performs no appreciable function other than to make an instruction bundle meet architectural requirements and thereby make an associated execution unit unavailable.

It is also important to note that bundles may be created that are legal but degrade performance. For example, in Itanium, if an instruction group includes two M instructions, 1 I instruction and 1 A instruction, some legal but inefficient groupings include: A) MMI MII_, B) MII MII_, C) MMF MFI_, and D) MII MFI_. Again, the underscore indicates the presence and postion of the stop bit. These bundle pairs are inefficient because they oversubscribe the available execution units and cause stalls. Itanium has 2 M-units, 2 I-units, 2 F-units and 3 B-units. Therefore examples A) and C) will stall when the third M instruction is encountered while examples B) and D) will stall when the third I instruction is encountered. It makes no difference that the 3rd M and 3rd I instructions are NOPs. They still must be dispatched to an execution unit and will cause a stall if no unit is available.

Some legal and efficient bundles for the same input include MII MFB, MFI MFI, and MIB MIB. These bundle pairs are efficient in that there are sufficient execution units to allow concurrent execution with no stalls.

The present invention provides a mechanism to quickly organize instructions into valid bundles that will efficiently exploit the resources of the target processor. With the present invention, bundle creation is the final step in compilation and the bundles are emitted, i.e. code is generated for the instructions, directly into a code buffer associated with the processor. The input to the bundle creation is a stream of intermediate instructions organized into instruction groups by a previous operation. The step of organizing intermediate instructions into instruction groups may be performed, for example, using the apparatus and method described in co-pending and commonly assigned U.S. patent application Ser. No. 09/671,874, filed Sep. 28, 2000, which is hereby incorporated by reference. It is assumed that the creator of the instruction groups is aware of the limitations and special requirements of the target implementation and that the instruction groups will not include instruction combinations that will force oversubscription of hardware resources assuming optimal bundling is performed. The end of each instruction group is identified by a stop flag set to one in the final intermediate instruction of each instruction group.

With the present invention, prior to performing the instruction bundle creation, the apparatus and method of the present invention gathers information about the underlying architecture for use in the instruction bundle creation. The information gathered includes the number of each type of execution unit available and the number of bundles that can be concurrently by the architecture. For example, Itanium has two I-units, two M-units, two F-units, and three B-units and can dispatch a maximum of two bundles concurrently. As described in the incorporated U.S. patent application Ser. No. 09/671,874, filed Sep. 28, 2000, this information may be obtained as part of or previous to the step of instruction group creation.

Once the architecture limitation information is obtained, instruction bundle creation may be performed. The instruction bundle creation is performed an instruction group at a time. Thus, an instruction group is fed to the instruction bundle creation apparatus/method, instruction bundle creation is performed, the instruction bundle is output to a code buffer, and the next instruction group is provided to the instruction bundle creation apparatus/method. This process is repeated for each instruction group in the input instruction stream.

The instruction bundle creation follows a number of rules:

1) Instructions of the same instruction type will preserve there original order. This allows instruction group creation to allow write-after-read (legal in IA64) for instructions of the same type within the same group; For example if the original programming order were:

```
mov   r5 = 1
;;
mov   r4 = r5
mov   r5 = 2
;;
``` where ;; = stop bit, when these 2 instruction groups complete, r4 will contain a 1. If the final 2 instructions were inverted it is architecturally unpredictable what would be in r4.

2) Branches will normally appear only in the final bundle of an instruction group as they can dynamically terminate the group and in implementations such as Itanium, bundles MFB, MIB and MMB will always cause a split issue (stall) after the B syllable;

3) For machines where the number of M-units is equal or less than the number of concurrent bundles, MM templates will only be used when there are 3 or fewer instructions remaining in the group (note that each bundle type except BBB requires an M-unit instruction);

4) Instructions are taken in order of their flexibility in terms of where that instruction can be placed in the available bundle types; and 5) for Itanium, avoid MBB and BBB templates when only a single B instruction remains because Itanium employs less efficient branch prediction for these template types.

In view of these rules, the instruction bundle creation process will now be described. The bundle creation process is performed based on a most restrictive instruction type placement and proceeds to less restrictive instruction type placement. The following description of a preferred embodiment of the present invention is provided only for illustrative purposes and is not meant to imply any limitation on the order or type of bundle creation checks performed.

The following description is provided based on the Itanium implementation of the IA64 architecture. The following description makes reference to a plurality of different checks with the results being various templates for instruction bundles. It should be appreciated that once an instruction bundle template is determined in the manner set forth below, instructions are assigned to the bundles in accordance with the instruction bundle templates.

As a preliminary step to the instruction bundle creation, the number of instruction types in the instruction group is counted and stored as TypesA, TypesM, TypesI, TypesB, TypesF, TypesLX. Two additional counters, TypesMIA and TypesALL, are incremented concurrently with the individiual counters as apporopriate. TypesAll is incremented for each instruction type and TypesMIA is incremented when any of TypesM, TypesI or TypesA is incremented. Once the number of instruction types in the instruction group is known, bundle creation is performed beginning with a check for the most common instruction combinations and proceeding to an algorithm based on a most restrictive instruction type placement and proceeding to less restrictive instruction type placement. As instructions are selected for inclusion in bundles the corresponding counters are decremented.

An overview of the bundling process is laid out below. The details of the process are exposed in the pseudo code figures and the descriptions thereof.

To promote efficient bundling, the most common case is handled first. This is where all the (remaining) instructions in the group are of the type M, I or A. When many instructions remain, these instructions will be packaged into several MMI and MII bundles. MMI bundles will be generated as long as the majority of remaining instructions are of type M. Otherwise, MII bundles will be generated.

For small instruction groups (or when only a few instructions remain in a large instruction group) special care is taken to insure that the bundling does not introduce hardware oversubscription. This involves examination of both the current mix of instructions and the previous instruction bundle type. It may also result in a "request" to form a partial bundle. This occurs when there are 2 or fewer instructions remaining in the group and there are fewer than two I type instructions.

In this case, to improve instruction cache footprint, it may be best to package the remaining instructions into MI_I or (when there is a single M or A) M_MI bundles. However, the final determination cannot be made until the subsequent instruction group is examined to determine if such packaging would have an adverse effect on overall performance. Instead a variable is set and passed to the next iteration of the instruction bundler to indicate that the previous group could be terminated with M_MI or MI_I. If that subsequent group can make good use of the available bundle fragments (MI or I) then the M_MI or MI_I bundles will be formed. Otherwise, the preceding bundle is completed by inserting appropriate NOP(s) and assigning a template that has no intra-bundle stop but has a stop at the end of the bundle. In this way, the new instruction group will start with a "fresh" bundle. For example, on Itanium, if the preceding instruction group indicates that it could be concluded in an MI_I bundle and the current instruction group includes: 2 M types, 2 I types and 1 B type, then one of the I types could be included in the previous bundle. However, because of the remaining mix of instructions an additional two bundles would be required to hold the remaining instructions. For example the group could be packaged as MI_I MFB MIB_. Note that second instruction group would span more than the 2 bundle dispersal window of Itanium and would require a minimum of two cycles to complete. Instead, the current invention would reject the invitation to bundle the preceding group with an MI_I bundle and would cause the instructions to be organized as MFI_ MII MFB_. Thus the second group could be executed in a single cycle with no adverse effects on the preceding group.

After the common cases are handled the focus is shifted to the most restrictive instruction types. For Itanium, if there are instructions that must run in I0 or F0 they are placed in bundles first. Otherwise, if there are any LX instructions in the instruction group, it is known that only a MLX bundle can contain a LX instruction and therefore a MLX bundle is created.

The next most restrictive instruction type to consider is branch. In that the branches must appear as the final instructions in the instruction group, a determination is made as to whether there are any B (branch) instructions and whether there are 2 or fewer instrucions of all other types. If there are B instructions and two or fewer other instructions, a determination is made as to whether there are any F instructions in the instruction group. If there are two F instructions or an F and an I instruction, it is known that the inclusion of the branches must be postponed as there is no bundle that can contain such a combination of F and I instructions and also contain a branch. Instead, a MFI bundle is created. Otherwise, if there is a single F instruction, it is known that MFB would be an effective instruction bundle.

If there are no F instructions but there are B instructions, a determination is made as to whether there are any I instructions. If there are two I instructions, the inclusion of branches again must be postponed as there is no IIB template. Instead a MII bundle is generated. If there are not two I instructions, but there are two M instructions and a single B instruction a MMB bundle is generated to end the instruction group. Otherwise, if there are two non-B instructions they must include at most one I and one M. In this case the bundle MIB will be an effective choice.

If there is only one B instruction, and the above checks are not met, the bundles may effectively include a MFB type bundle. If there are two B instructions and the above checks are not met, the bundles may include a MBB type bundle. Otherwise, if none of the above applies, then there must be more than 2 B instructons remaining and no non-B instructions. In this case the BBB template is the best choice.

Once the instruction bundle creation is performed based on the LX and B instruction placement, a determination is made as to whether there are any F instructions remaining. If so, a determination is made as to whether there are only three instructions remaining which include two M instructions. If so, the bundles can effectively include a MMF type instruction bundle. Otherwise, if there is an I or A instruction or there are three B instructions, the MFI template would be an effective template for one of the bundles.

Once all instructions in the instruction group are added to bundles using the process described above, a stop bit is inserted unless an M_MI or MI_I bundle is being proposed. In either case, if more instruction groups remain the process is repeated. Otherwise, if an M_MI or MI_I bundle has been proposed, the unfinished bundle is completed by inserting appropriate NOP(s) and assigning template MFB_ for M_MI and MIB_ for template MI_I. At that point the process is complete.

Figure 3A:
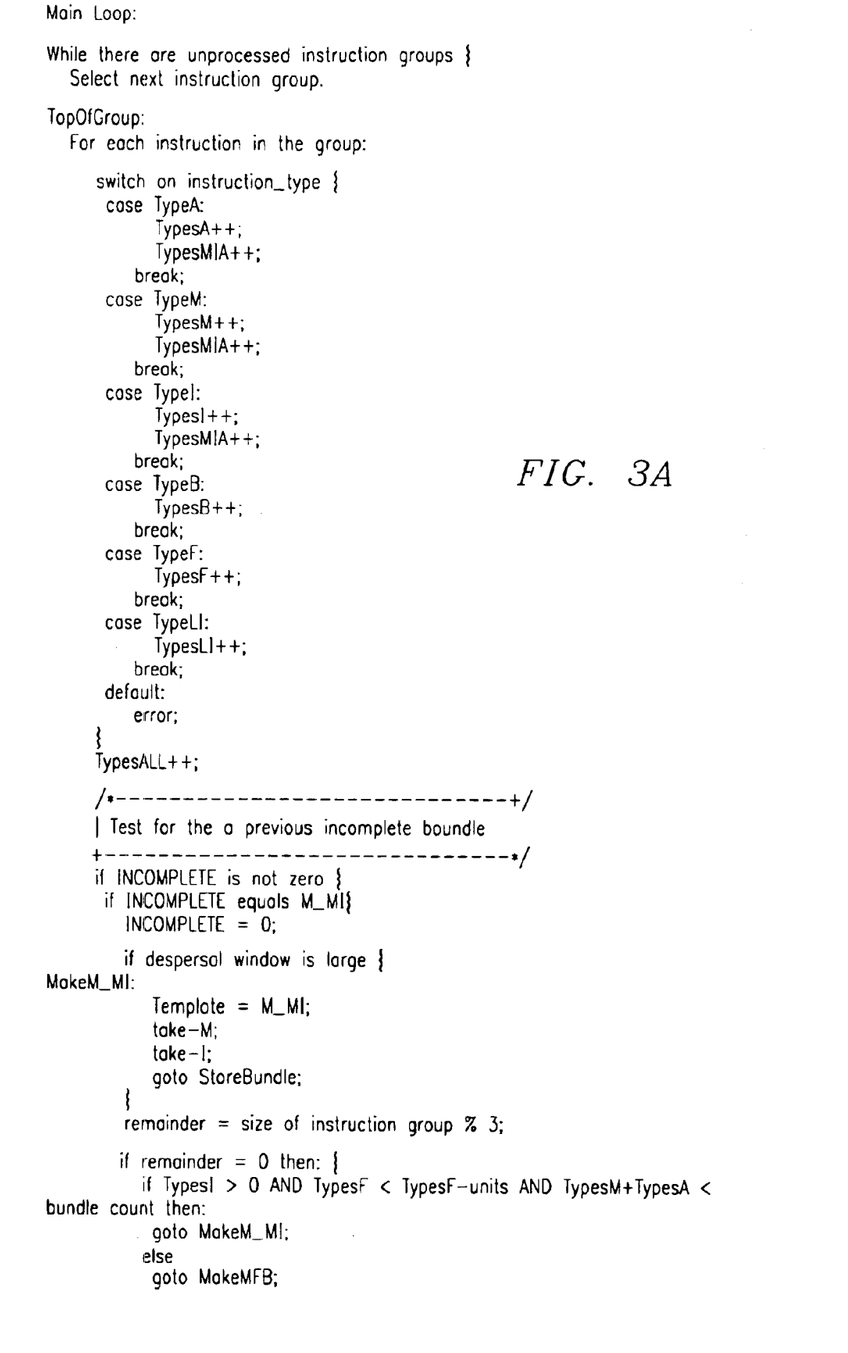
Figure 3B:
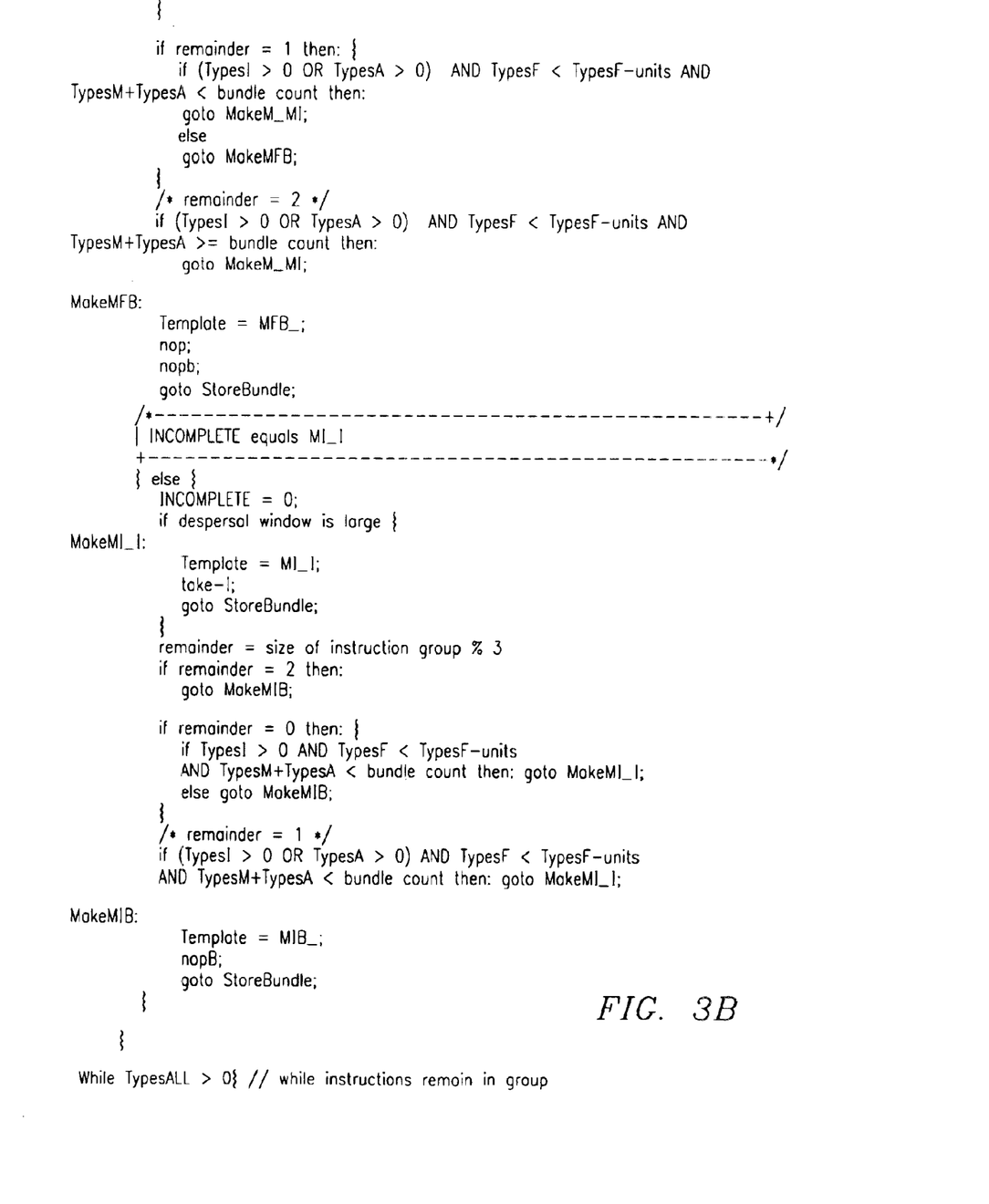

FIGS. 3A–3C are diagrams illustrating pseudo-code for performing the method of the present invention for Itanium. The following terms, used in FIGS. 3A–3C, have the following associated meanings:

Take-M: take first remaining M0 instruction; if none, take first remaining M instruction; if none, take first remaining A instruction; if none, insert NOP instruction.

Take-I: take first remaining I0 instruction; if none, take first remaining I instruction; if none, take first remaining A instruction; if none, insert NOP.

Take-F: take first remaining F0 instruction; if none, take first remaining F instruction; if none, insert NOP;

Take-LX: take the first remaining LX instruction (take-LX is never executed when there is no LX instruction remaining).

Take-B: take the first remaining B instruction; if none, insert NOPB (branch has its own special NOP, described below).

NOP: insert NOP (note execution units M, I and F share the same NOP instruction).

NOPB: insert branch NOP (this NOP has the same effect as NOP but has a different opcode and format).

The pseudo-code shown in FIGS. 3A–3C provide one possible implementation of the present invention and is not meant to be limiting in any way. Essentially, the pseudo-code in FIGS. 3A–3C provide a series of checks and associated bundle templates into which instructions are bundled.

First the most common cases are handled and then the checks flow from a most restrictive type of instruction placement to a less restrictive type instruction placement. When fewer than 3 instructions remain in an instruction group, a determination is made as to whether an intra-bundle might be formed with the final instructions. If so, a variable, INCOMPLETE, is set to indicate the type of bundle (M__MI or MI__I) being considered. However, the completion of the bundle including template selection is postponed until the counters available for the next instruction group. At that time it can be determined if instructions from the new group can effectively populate the remaining slot(s) of the previous bundle. If so the bundle suggested by INCOMPLETE is created. Otherwise, if INCOMPLETE is M__MI the previous bundle is finished by filling in NOPs and assigning it the MFB__ template. Whereas if it is MI__I it is completed as a MIB__ template.

Figure 4:
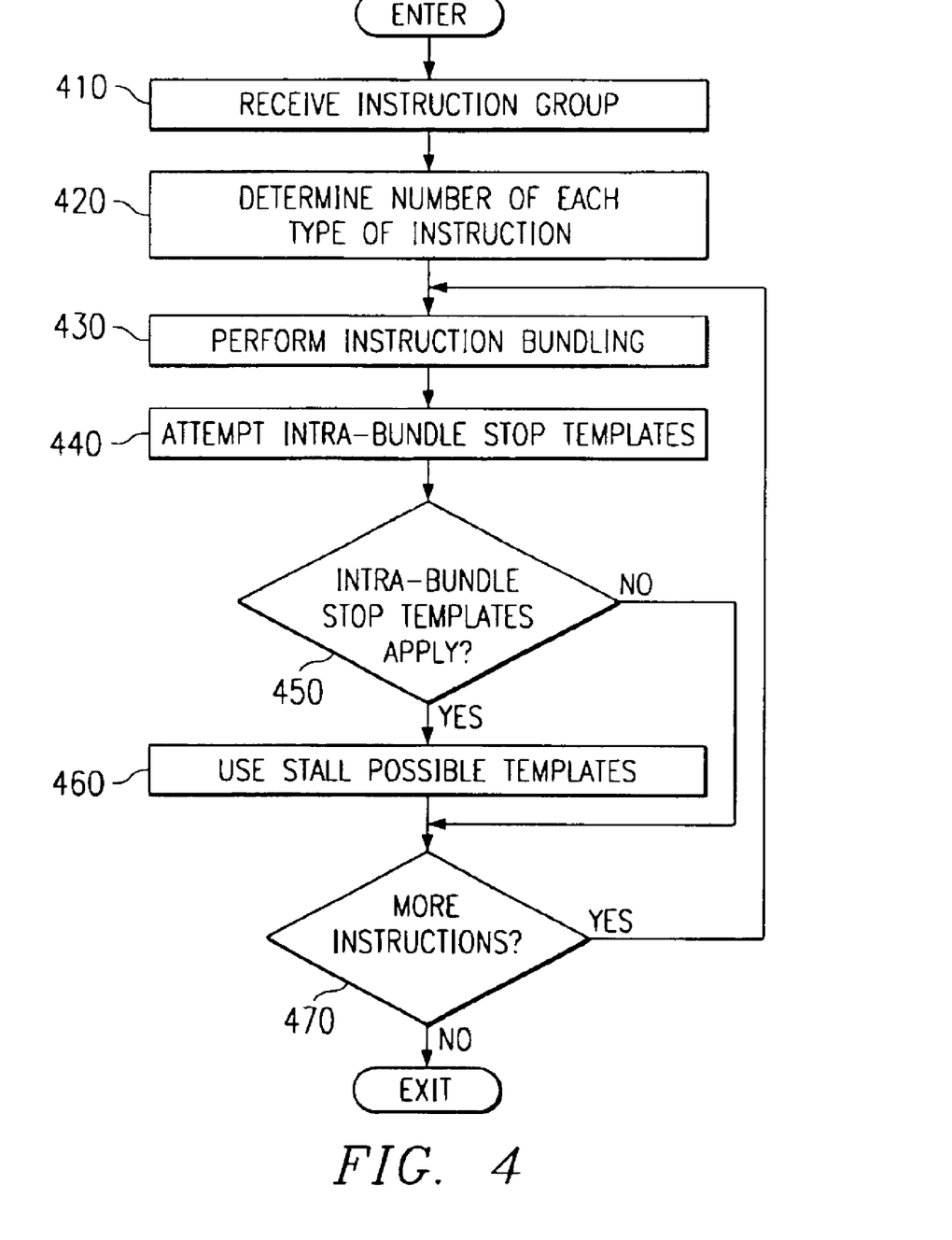
FIG. 4 is a flowchart outlining an exemplary operation of the present invention.

FIG. 4 is a flowchart outlining an exemplary operation of the present invention. As shown in FIG. 4, the operation starts with receiving an instruction group as input (step 410). The number of each instruction type is determined (step 420). A determination is made as to whether the variable INCOMPLETE is zero (step 430). If INCOMPLETE is not zero, a determination is made as to whether the current mix of instructions could effectively populate the fragment (step 440). If so the intra-stop bundle is completed by inserting one or two instructions from the current group into the previous bundle (step 450). Otherwise, the previous bundle is completed by inserting NOP(s) and using template MIB__ (for MI__I) or MFB__ (for M__MI) (step 460).

If INCOMPLETE is zero in step 430, instruction bundle creation is performed with regard to the efficient bundle templates (step 470). This may be performed in the manner outlined above. The operation then ends.

Thus, the present invention provides a mechanism by which efficiently executed instruction bundles may be created in a quick manner. With the present invention, very little CPU time is required to bundle instructions from instruction groups in an optimized manner such that execution of the instruction bundles maximizes the efficiency of the overall system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for creating instruction bundles, comprising:

receiving an instruction group having one or more instructions;

automatically determining a number of each possible type of instruction in the one or more instructions of the instruction group; and dynamically creating one or more instruction bundles based on the number of each possible type of instruction in the one or more instructions of the instruction group.

2. The method of claim 1, wherein receiving an instruction group having one or more instructions includes receiving a stream of intermediate instructions organized into instruction groups.

3. The method of claim 1, further comprising gathering information about an architecture for use in creating instruction bundles.

4. The method of claim 3, wherein the information includes at least one of a number of each type of execution unit available in the architecture and a number of bundles that can be dispatched concurrently by the architecture.

5. The method of claim 2, wherein the steps of determining a number of each possible type of instruction and creating one or more instruction bundles are performed for each instruction group in the stream of intermediate instructions.

6. The method of claim 1, wherein creating one or more instruction bundles is performed based on a most common instruction combination first.

7. The method of claim 6, wherein creating one or more instruction bundles is performed based on a most restrictive instruction type placement and proceeds to less restrictive instruction type placement second.

8. The method of claim 1, wherein creating one or more instruction bundles is performed based on a most restrictive instruction type placement and proceeds to less restrictive instruction type placement.

9. The method of claim 1, wherein determining a number of each possible type of instruction in the one or more instructions of the instruction group includes incrementing instruction counters based on the number of each possible type of instruction in the one or more instructions, and wherein creating one or more instruction bundles includes decrementing the instruction counters as instructions are added to instruction bundles.

10. The method of claim 6, wherein the most common instruction combination is where all instructions in the instruction group are of a memory instruction type, integer instruction type or integer arithmetic logic unit type.

11. The method of claim 1, wherein creating one or more instruction bundles includes ensuring that creating the one or more instruction bundles does not introduce hardware oversubscription.

12. The method of claim 11, wherein ensuring that creating the one or more instruction bundles does not introduce hardware oversubscription includes forming partial instruction bundles.

13. An apparatus in a data processing system for creating instruction bundles, comprising:

means for receiving an instruction group having one or more instructions;

means for automatically determining a number of each possible type of instruction in the one or more instructions of the instruction group; and means for dynamically creating one or more instruction bundles based on the number of each possible type of instruction in the one or more instructions of the instruction group; and means for dynamically creating one or more instruction bundles based on the number of each possible type of instruction in the one or more instructions of the instruction group, wherein the means for creating one or more instruction bundles operates in view of one or more of the following rules:

1) instructions of the same instruction type will preserve there original order;
2) branches will normally appear only in the final bundle of an instruction group;
3) for architectures where a number of M execution units is equal or less than a number of concurrent bundles, MM templates will only be used when there are three or fewer instructions remaining in the group;
4) instructions are taken in order of their flexibility in terms of where that instruction can be placed in the available bundle types; and
5) MBB and BBB templates are avoided when only a single B instruction remains.

14. The apparatus of claim 13, wherein the means for receiving an instruction group having one or more instructions includes means for receiving a stream of intermediate instructions organized into instruction groups.

15. The apparatus of claim 13, further comprising means for gathering information about an architecture for use in creating instruction bundles.

16. The apparatus of claim 15, wherein the information includes at least one of a number of each type of execution unit available in the architecture and a number of bundles that can be dispatched concurrently by the architecture.

17. The apparatus of claim 14, wherein the means for determining a number of each possible type of instruction and means for creating one or more instruction bundles operate on each instruction group in the stream of intermediate instructions.

18. The apparatus of claim 13, wherein the means for creating one or more instruction bundles creates the one or more instruction bundles based on a most common instruction combination first.

19. The apparatus of claim 18, wherein the means for creating one or more instruction bundles creates the one or more instruction bundles based on a most restrictive instruction type placement and proceeds to less restrictive instruction type placement second.

20. The apparatus of claim 13, wherein the means for creating one or more instruction bundles creates the one or more instruction bundles based on a most restrictive instruction type placement and proceeds to less restrictive instruction type placement.

21. The apparatus of claim 13, wherein the means for determining a number of each possible type of instruction in the one or more instructions of the instruction group includes means for incrementing instruction counters based on the number of each possible type of instruction in the one or more instructions, and wherein the means for creating one or more instruction bundles includes means for decrementing the instruction counters as instructions are added to instruction bundles.

22. The apparatus of claim 18, wherein the most common instruction combination is where all instructions in the instruction group are of a memory instruction type, integer instruction type or integer arithmetic logic unit type.

23. The apparatus of claim 13, wherein the means for creating one or more instruction bundles includes means for ensuring that creating the one or more instruction bundles does not introduce hardware oversubscription.

24. The apparatus of claim 23, wherein the means for ensuring that creating the one or more instruction bundles does not introduce hardware oversubscription includes means for forming partial instruction bundles.

25. A computer program product in a computer readable medium for creating instruction bundles, comprising:

first instructions for receiving an instruction group having one or more instructions;

second instructions for automatically determining a number of each possible type of instruction in the one or more instructions of the instruction group; and third instructions for dynamically creating one or more instruction bundles based on the number of each possible type of instruction in the one or more instructions of the instruction group, wherein the third instructions for creating one or more instruction bundles are executed in view of one or more of the following rules:

1) instructions of the same instruction type will preserve there original order;
2) branches will normally appear only in the final bundle of an instruction group;
3) for architectures where a number of M execution units is equal or less than a number of concurrent bundles, MM templates will only be used when there are three or fewer instructions remaining in the group;
4) instructions are taken in order of their flexibility in terms of where that instruction can be placed in the available bundle types; and
5) MBB and BBB templates are avoided when only a single B instruction remains.

26. The computer program product of claim 25, wherein the first instructions for receiving an instruction group having one or more instructions includes instructions for receiving a stream of intermediate instructions organized into instruction groups.

27. The computer program product of claim 25, further comprising fourth instructions for gathering information about an architecture for use in creating instruction bundles.

28. The computer program product of claim 25, wherein the information includes at least one of a number of each type of execution unit available in the architecture and a number of bundles that can be dispatched concurrently by the architecture.

29. The computer program product of claim 26, wherein the second instructions for determining a number of each possible type of instruction and third instructions for creating one or more instruction bundles are executed on each instruction group in the stream of intermediate instructions.

30. The computer program product of claim 25, wherein the third instructions for creating one or more instruction bundles creates the one or more instruction bundles based on a most common instruction combination first.

31. The computer program product of claim 30, wherein the third instructions for creating one or more instruction bundles creates the one or more instruction bundles based on a most restrictive instruction type placement and proceeds to less restrictive instruction type placement second.

32. The computer program product of claim 25, wherein the third instructions for creating one or more instruction bundles creates the one or more instruction bundles based on a most restrictive instruction type placement and proceeds to less restrictive instruction type placement.

33. The computer program product of claim 25, wherein the second instructions for determining a number of each possible type of instruction in the one or more instructions of the instruction group includes instructions for incrementing instruction counters based on the number of each possible type of instruction in the one or more instructions, and wherein the third instructions for creating one or more instruction bundles includes instructions for decrementing the instruction counters as instructions are added to instruction bundles.

34. The computer program product of claim 30, wherein the most common instruction combination is where all instructions in the instruction group are of a memory instruction type, integer instruction type or integer arithmetic logic unit type.

35. The computer program product of claim 25, wherein the third instructions for creating one or more instruction bundles includes instructions for ensuring that creating the one or more instruction bundles does not introduce hardware oversubscription.

36. The computer program product of claim 35, wherein the instructions for ensuring that creating the one or more instruction bundles does not introduce hardware oversubscription includes instructions for forming partial instruction bundles.

* * * * *

UNITED STATES PATENT AND TRADEMARK OFFICE
CERTIFICATE OF CORRECTION

PATENT NO.         : 6,912,647 B1                                           Page 1 of 1
APPLICATION NO. : 09/671875
DATED              : June 28, 2005
INVENTOR(S)        : Blandy It is certified that error appears in the above-identified patent and that said Letters Patent is hereby corrected as shown below:

Col. 10, line 7: after "group" insert
--, wherein creating one or more instruction bundles is performed in view of one or more of the following rules:
1) instructions of the same instruction type will preserve there original order;
2) branches will normally appear only in the final bundle of an instruction group;
3) for architectures where a number of M execution units is equal or less than a number of concurrent bundles, MM templates will only be used when there are three or fewer instructions remaining in the group;
4) instructions are taken in order of their flexibility in terms of where that instruction can be placed in the available bundle types; and
5) MBB and BBB templates are avoided when only a single B instruction remains.--

Col. 10, line 65: after "group" delete
"; and
means for dynamically creating one or more instruction bundles based on the number of each possible type of instruction in the one or more instructions of the instruction group".

Col. 12, line 37: after "claim" delete "25" and insert --27--.

Signed and Sealed this

Eighth Day of August, 2006

JON W. DUDAS
*Director of the United States Patent and Trademark Office*